(12) United States Patent
Alameh et al.

(10) Patent No.: US 8,766,805 B2
(45) Date of Patent: Jul. 1, 2014

(54) SMART ADAPTIVE DEVICE FOR ALERTING USER OF SCHEDULED TASKS PRIOR TO FALLING ASLEEP

(75) Inventors: Rachid M Alameh, Crystal Lake, IL (US); William P Alberth, Prairie Grove, IL (US); Timothy Dickinson, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 269 days.

(21) Appl. No.: 13/305,009

(22) Filed: Nov. 28, 2011

(65) Prior Publication Data
US 2013/0135108 A1    May 30, 2013

(51) Int. Cl.
*G08B 23/00* (2006.01)

(52) U.S. Cl.
USPC ......................... 340/575; 340/573.1; 600/300

(58) Field of Classification Search
USPC .............. 340/575, 576, 573.1, 539.1, 539.12; 600/300, 372, 509, 519; 701/1, 36, 49; 180/272, 280
See application file for complete search history.

(56) References Cited

U.S. PATENT DOCUMENTS

| | | | |
|---|---|---|---|
| 7,415,100 B2 | 8/2008 | Cooper et al. | |
| 7,460,899 B2 * | 12/2008 | Almen | 600/509 |
| 7,898,426 B2 | 3/2011 | Rai et al. | |
| 2001/0028309 A1 * | 10/2001 | Torch | 340/575 |
| 2007/0273504 A1 * | 11/2007 | Tran | 340/539.12 |
| 2009/0273478 A1 | 11/2009 | Mei | |
| 2011/0230790 A1 * | 9/2011 | Kozlov | 600/595 |

OTHER PUBLICATIONS

Appbrain, "Gentle Alarm", Mobitobi, Jul. 18, 2011, 2 pages, http://www.appbrain.com/app/gentle-alarm/com.mobitobi.android.gentlealarm.

Appbrain, "Sleep Now!", Mobitobi, Jul. 18, 2011, 2 pages, http://www.appbrain.com/app/sleep-now/com.mobitobi.android.sleepnow.

* cited by examiner

*Primary Examiner* — Anh V La

(57) ABSTRACT

A method is provided for alerting a user of scheduled tasks prior to falling asleep. The method includes associating an alarm device with a user's body by securing a wearable device to the user's wrist, placing the device in a pocket, integrating the device into the user's clothing such as a belt, or otherwise placing the device in contact with or adjacent to the user. The device includes one or more sensors for detecting physiological and/or environmental parameters such as heart, respiration, or pulse rate, body movements, eye movements, ambient light, and the like. Upon detecting a pre-sleep state, the device gathers information about tasks which the user desires to perform or attend to prior to going to sleep, and alerts the user before falling asleep.

20 Claims, 3 Drawing Sheets

US 8,766,805 B2

SMART ADAPTIVE DEVICE FOR ALERTING USER OF SCHEDULED TASKS PRIOR TO FALLING ASLEEP

TECHNICAL FIELD

The present disclosure relates generally to wearable devices and more particularly to wearable devices and methods for reminding the user of scheduled tasks prior to falling asleep.

BACKGROUND

Modern electronic devices include increasing functionality as technologies converge on single platforms. For example, computers, mobile phones, personal digital assistants, music players, video players, televisions, and network technology are being encompassed on a single device. These devices are being built smaller and smaller, and they may incorporate multiple input mechanisms such as one or more keys and a touch-screen as well as proximity and image-based input components. Such devices may include portable computers, cellular telephones and smart phones and perform a number of functions, including receiving emails and other messages, playing audio and video content, and signaling an audible or haptic alarm.

BRIEF SUMMARY

In one exemplary embodiment, a method of alerting a user of tasks requiring attention prior to falling asleep is provided. The method includes sensing a physiological parameter of the user through an alarm device proximate to the user's body, detecting the onset of a sleep state of the user, gathering scheduled tasks pertaining to the user, and alerting or querying the user with respect to these issues before the user goes to sleep.

In another exemplary embodiment, a wireless communication device for a user is provided. The device includes a wearable device for alerting a user of scheduled tasks prior to falling asleep. The device includes a display module for facilitating user interaction, a sensor for detecting a pre-sleep state of the user, a memory module associated with the device, an alerting module for alerting the user, and a controller coupled to the display module, the sensor, the memory module, and to the alerting module. The controller is configured to retrieve a scheduled task from memory and thereafter actuate the alerting module upon receipt of a signal from the sensor indicative of a pre-sleep state. In this regard, collecting information relating to tasks may include gathering data pertaining to meetings, messages, appointments, scheduled or time-sensitive events, weather events that can alter scheduled events, and the like. In some cases, pre-sleep state detection can be assisted by considering prior user history stored in the device, such as data regarding when a user goes to sleep each day.

Furthermore, other desirable features and characteristics will become apparent from the subsequent detailed description and the appended claims, taken in conjunction with the accompanying drawings and this background.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses of the wearable device described herein. Furthermore, there is no intention to be bound by any theory presented in the preceding background or the following detailed description.

Broadly, exemplary embodiments disclosed herein provide a device for detecting a pre-sleep state of a person wearing the device, and to alert or query the user regarding tasks to be attended to prior to falling asleep. Upon detecting a pre-sleep state of the user, that is, as the user starts to fall asleep but before actually entering a sleep state, the device may retrieve information relating to tasks, events, or scheduled items which the user desires to attend to or be reminded of before falling asleep. These tasks, events, and the like may be retrieved from a number of local (on-board) and/or remote (off-board) sources, such as a "to do" list, calendar, news and weather alerts, call logs, voice mail, email, text messages, social networks, blogs and billboards, task lists, alarm settings, user history data, contacts databases, medical and wellness data, meeting schedules, internet, television, radio, satellite, music and entertainment sites and venues, and the like. Moreover, one or more of these sources may be linked, merged, docked, updated, or shared with similar sources from the same or other users.

Figure 1A:
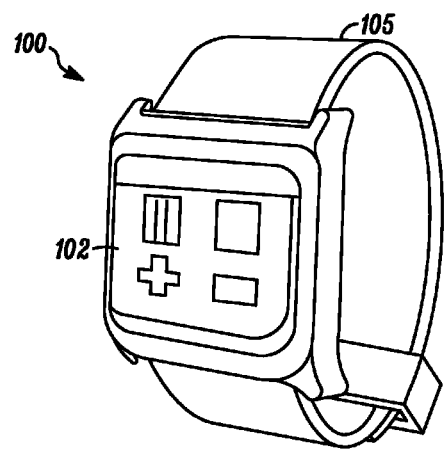
FIG. 1A is a front view of a wearable alarm device in accordance with an exemplary embodiment.

FIG. 1A is a front view of a wearable device 100 in accordance with an exemplary embodiment. Although exemplary embodiments are discussed below with reference to wearable devices, the systems and methods discussed herein are equally applicable to any type of device. In the illustrated exemplary embodiment, the device 100 is in the form of a watch having a watch face which may be configured as a modified "desktop" interface. Device 100 includes a device 102 and an attachment band 105 for attaching the device to the user's wrist, upper arm, neck, leg (e.g., thigh or ankle), waist, head, or the like. Band 105 may be a single or multi-piece belt or strap, and may be stiff, flexible, elastic, or adjustable to accommodate the particular mode of attachment. In a further embodiment, device 102 may be worn as a pendant, broach, headband, or may be sewn, stitched, fastened to or otherwise integrated into the user's clothing, cap, undergarments, or the like.

Figure 1B:
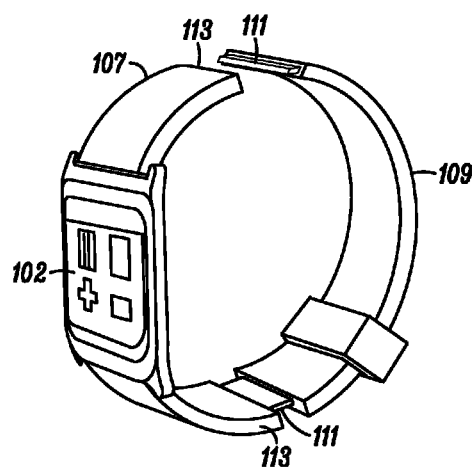
FIG. 1B is a side view of the wireless device of FIG. 1 in accordance with an exemplary embodiment.

FIG. 1B shows a detachable strap having a first part 107 connected to device 102 and a second part 109 releasably fastened to first part 107. For this purpose, first part 107 includes a clasp portion 113 and second part 109 includes a mating clasp portion 111. Respective clasp portions 111 and 113 may be releasably fastened together to secure device 100 to a user's body. Alternatively, one or both parts 107, 109 may be separated from device 102 to facilitate placement in a pocket, hood, sleeve, or the like.

Device 102 may be embodied, for example, in a device such as a cellular phone, smart phone, MP3 player, iPod™ player, personal digital assistant (PDA), mobile handset, personal computer (PC), gaming device, security device, wellness device, alarm clocks, portable device, television, radio, or the like. In the illustrated exemplary embodiment, device 100 is in the form of a wrist watch. Alternatively, the device may be configured in any convenient manner to permit monitoring and/or detection of one or more parameters associated with a pre-sleep state.

More particularly, a number of parameters may be monitored and evaluated in order to ascertain, or infer, the onset of sleep. For example, a video camera or other hardware for capturing image data may be used to detect the user's eyes closing, blinking frequency, or head nodding. A pre-sleep or sleep state may also be detected based on EEG patterns, or inferred from various physiological, environmental and/or contextual circumstances such as the user changing into pajamas, brushing teeth, brushing hair, getting into bed, pulling covers over the user's body, galvanic skin response, thermal sensing (e.g., skin temperature), ambient light, temperature, heart rate profile, breathing profile, or background noise or motion.

The device 100 may be, for example, a handheld wireless device, such as a mobile phone, a Personal Digital Assistant (PDA), a smart phone, tablet or laptop computer, a multimedia player, a MP3 player, a digital broadcast receiver, remote controller, or any other electronic apparatus. Many embodiments may be portable and hand-held, but this is not required. In one exemplary embodiment, the device 100 is a cellular phone that exchanges information with a network (not shown). The network may be, for example, a wireless telecommunication network, the Internet, a public switched-phone network, and the like, and the type of information exchanged with the network may include voice communication, digital data, SMS messaging, MMS messaging, Internet access, multi-media content access, voice over internet protocol (VoIP), and other conventional communication standards and protocols.

Figure 2:
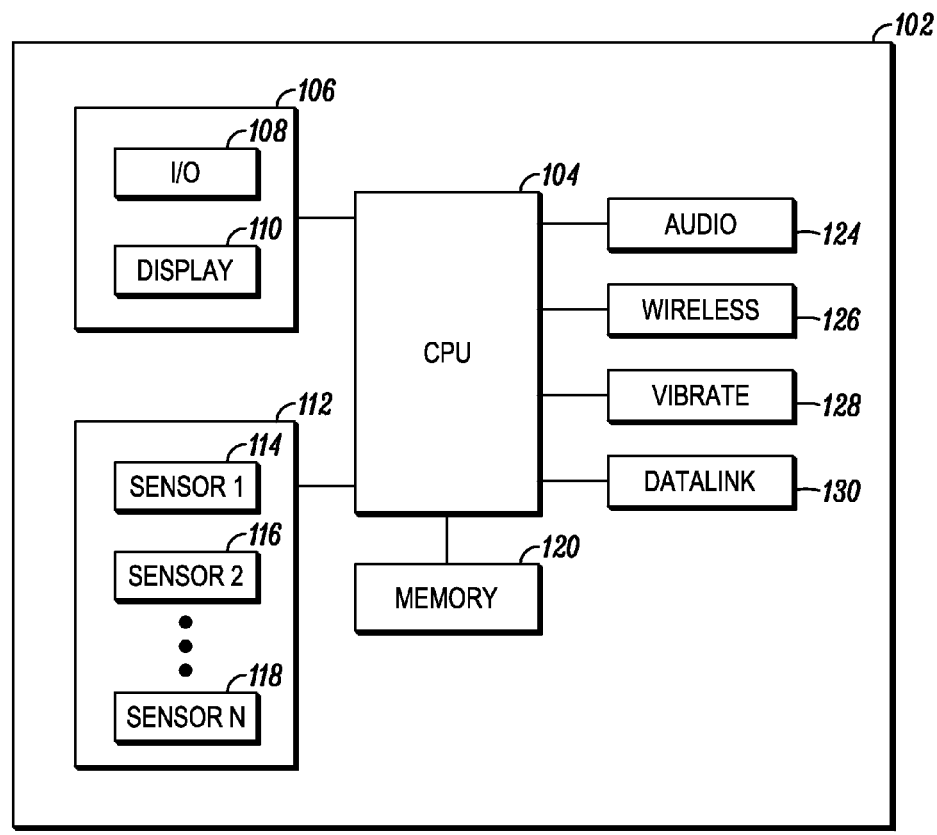
FIG. 2 is a block diagram a wireless device in accordance with an exemplary embodiment.

FIG. 2 is a block diagram of the device 102 of FIGS. 1A & 1B in accordance with an exemplary embodiment. In one implementation, the device includes a controller 104, a memory 120, a user interface 106 including a user input module 108 and a display 110, and a sensor module 112 including respective sensors 114-118. User input (or I/O) module 108 may include one or more of a touch-sensitive, numeric keypad, or traditional "QWERTY" keyboard implemented in hardware or as a screen display.

Sensors 114-118 may include one or more of an accelerometer or motion sensor 114, and ambient environment sensor 116 for sensing one or more of ambient light, GPS position coordinates, motion, sound, temperature, proximity sensor, motion sensors external to a wearable device wireless linked with the wearable device, video, pattern recognition, and the like, and a physiological data sensing module 118 for sensing one or more of skin temperature, moisture, electrical conductivity/resistivity, pulse oxymetry, pulse rate, blood pressure, heart rate, respiration, voice recognition, video pattern recognition, and the like.

The embodiment illustrated in FIG. 2 further includes one or more output modules such as, for example, an audio module 124, a communications module 126 such as a cellular transceiver or wireless network interface (e.g., Bluetooth, WiFi), a vibration module 128, a wireless interface to a light blinking device (e.g., and LED), and a data link 130 such as a USB, fire wire, or other suitable data port.

In general, the controller 104 controls the operation of the device 102 in accordance with computer instructions stored in memory 120. The controller 104 may be implemented using a digital signal processor, microprocessor, microcontroller, programmable logic unit, discrete circuits, or a combination thereof.

The memory 120, coupled to the controller 104, stores software programs for performing the functions described herein, including operation of the device 100, an operating system, various application programs, and data files. The memory 120 can include one or more forms of volatile and/or non-volatile, fixed and/or removable memory, such as read-only memory (ROM), electronic programmable read-only memory (EPROM), random access memory (RAM), and erasable electronic programmable read-only memory (EEPROM).

The memory 120 may include random access memory, read only memory, optical memory or any other type of memory. The memory 120 may be arranged and configured to store information to be used by other components of the device 102, including the user interface 106, the sensor module 112, the audio module 124, wireless communications module 126, vibration module 128, and data link 130.

In an exemplary embodiment, the memory 120 may be configured to store calendar, schedule, alarm, meeting, task list, and "to do" data, as well as information and data pertaining to voice and text messages, email messages, news and weather alerts, personal history and medical data, and any other information the system may access when retrieving and/or gathering reminders to be presented to the user upon detection of a pre-sleep state.

As mentioned above, task data may be fetched from on-board memory 120 or downloaded from remote sources, for example, through wireless module 126 and/or data link 130. Tasks may also be predicted from prior user history matching current drive context (location, time, day of week, device operation, etc.). That is, although the controller 104 and memory 120 are illustrated within the device 102, the processing and storage capabilities may be distributed and accessed from one or more networks or external storage devices. Depending on the embodiment, additional components may be provided or certain components omitted. The device 102 may be assembled from discrete components, or implemented in one or more integrated circuits, or it may be assembled from a combination of discrete components and integrated circuit components.

In general, the controller 104 is implemented as a processor, computer, integrated circuit, or the like controlled by software or firmware. The controller 104 communicates with sensor module 112 to obtain and interpret physiological and environmental information, as well as from I/O module 108 and memory 120, and evaluates received information to determine when the user in entering a first pre-sleep state or other conditions which indicate that the user desires to be alerted or reminded to take certain actions prior to falling asleep or entering into a second state, such as sleep.

When a pre-sleep state is detected, the system implements the appropriate functions in accordance with the desired user configured settings, including directing display 110 to alert the user with a visual image such as: "take your medication now"; "what time do you need to wake up?"; "you might want to wake up and leave early tomorrow due to predicted bad weather in the morning"; "do you need to lock the door?"; "did you call your boss?"; and the like. The system may alternatively remind, alert, or query the user using one or a combination of visual signals, haptic signals including vibration module 128, and/or audio signals (such as an alarm or a verbal reminder) to an audio speaker associated with sound module 124. In one exemplary embodiment, controller 104 may control the operation of the device in a default mode or a navigation mode based on the inputs received on the display 110 and a rear touch pad which may be part of I/O 108. For another embodiment, in response to detecting a pre-sleep state, the system may send one or more reminders to a remote device, a care taker, a family member, etc. in addition to, or in the alternative, to the detecting device.

The device 102 may also include a variety of other components (not shown) based on the particular implementation. For example, if the device 102 is implemented as a mobile phone, it would also include a microphone and a wireless transceiver and possibly additional input components such as a keypad, accelerometer, and vibration alert. If the device 102 is implemented as a remote controller, an infrared transmitter could also be included.

As noted above, the device 102 may be a communications device that supports various communication functions, including telephony, email, and web-browsing. As such, the controller 104 may control the device 102 to transmit, receive, modulate, or demodulate communications to and from a network, including wide area networks (WAN), such as cellular networks, local area networks (LAN), personal area networks (PAN), or any other type of network. These functions may be facilitated by the audio module 124 and the wireless communications module 126 and data link 130. The wireless module 126 may include a transceiver, transmitter or receiver such that the device 102 may communicate with a wireless or cellular network. The audio module 124 may include a microphone, a speaker, a transducer, or any audio input and output circuitry for converting audible signals to and from digital signals.

As introduced above, the device 102 includes a display 110 and an I/O module 108. The display 110 may include a liquid crystal display (LCD) or other suitable device to display information to the user, while the I/O 108 may include a keyboard, keys, touchscreen input, or combination of input mechanisms for receiving and making telephone calls and supporting other interactions between the user and the device 100. In some embodiments, the display 110 and I/O module 108 may be combined, for example, in a touch screen display configured to receive user input using a finger stylus.

Figure 3:
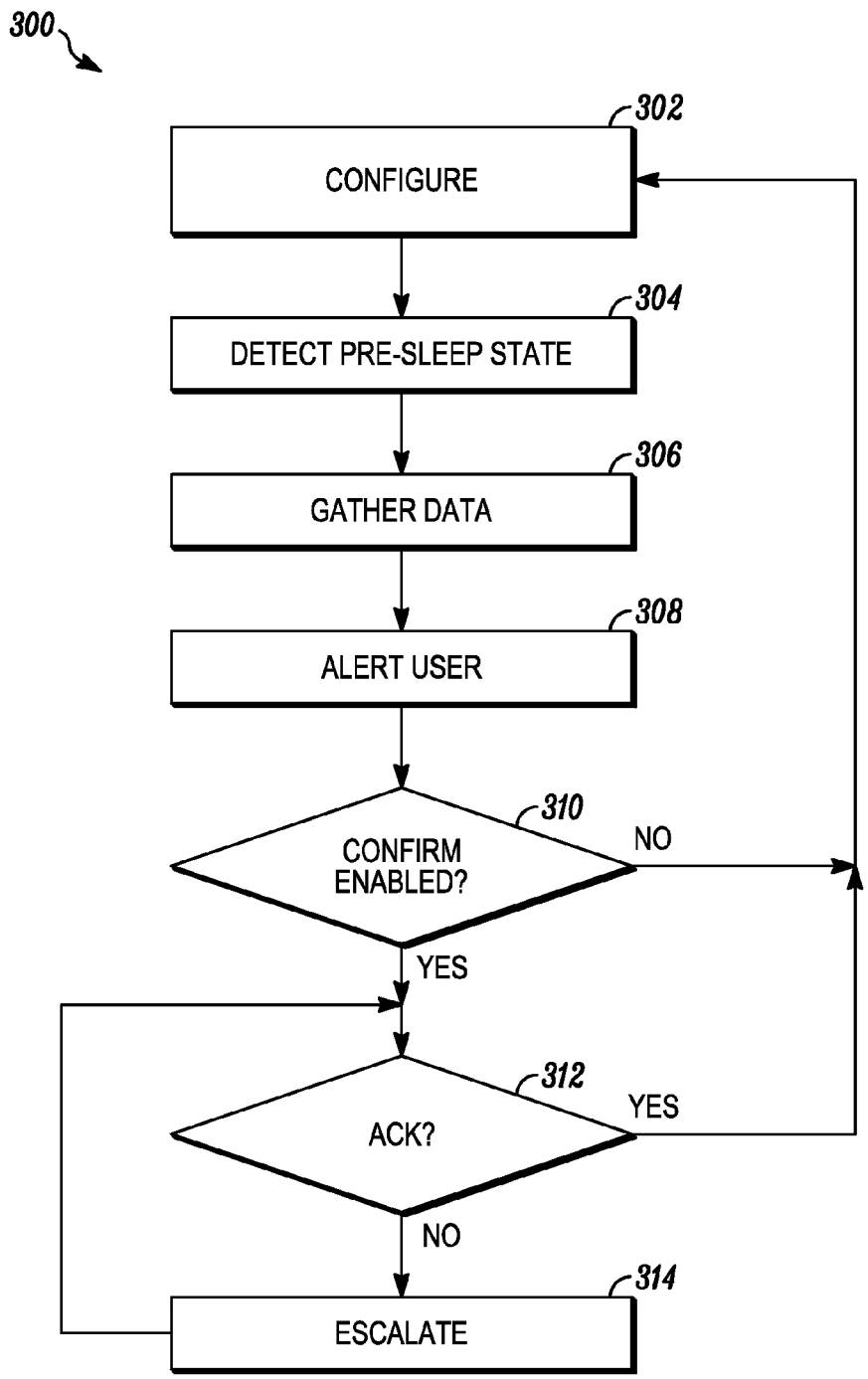
FIG. 3 is a flowchart illustrating the method of operation of the device of FIGS. 1-3 in accordance with an exemplary embodiment.

FIG. 3 is a flowchart of a method 300 for operating the device 102 in accordance with an exemplary embodiment. The device 102 is initially configured (task 302) to establish operational parameters such as, for example: enabling pre-sleep detection; selecting the sources from which reminders are to be gathered when a pre-sleep state is detected; enabling a confirmation function (discussed below); and defining the alarm modality (e.g., screen display, audible alarm, vibration).

Upon detection of a pre-sleep state (task 304), the system gathers data (task 306) pertaining to tasks and events about which the user has previously indicated (in task 302) a desire to be reminded. As discussed above, such information may be retrieved from local (on-board) sources (e.g. memory 120) or from remote (off-board) sources through the use of one or both of wireless module 126 and/or data link 130. Having assembled the tasks which require the user's attention before going to sleep, the device 100 accordingly alerts the user (task 308).

In an embodiment, the system allows the user to selectively enable a confirmation function in connection with configuration task 302. If this function is not enabled, the system simply passively alerts the user of assembled tasks to be attended to prior to going to sleep. If the confirmation function is enabled, the system requires the user to confirm or acknowledge one or more of the reminders to ensure that the task is attended to. If confirmation is enabled, the system delivers one or more increasingly escalating alerts until the alert is acknowledged (confirmed) by the user. The escalating alerts may take the form of audio and/or vibration alerts of increasing amplitude, frequency, and/or duration. For any of these embodiments, the user may be alerted or reminded of one or more scheduled tasks at the wearable device and/or a remote device that receives the information from the wearable device based on one or more predetermined settings or user preferences.

Referring again to FIG. 3, if the confirmation function is not enabled ("No" branch from task 310), following the delivery of an alert or reminder to the user the system returns to an initial state (e.g., to task 302) and monitors the user for the onset of a pre-sleep state. If confirmation is enabled ("Yes" branch from task 310), the system interrogates the user (task 312) for an acknowledgement that the alert has been received or that the task has been attended to. Upon receiving such an acknowledgement ("Yes" branch from task 312), the system resumes an initial state (e.g., task 302). If an acknowledgement is not timely received ("No" branch from task 312), the system delivers one or more increasingly escalating alerts (task 314) until the reminder is acknowledged or otherwise attended to ("Yes" branch from task 312).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing various embodiments. It being understood that various changes may be made in the function and arrangement of elements described in an exemplary embodiment without departing from the scope of the invention as set forth in the appended claims.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts described herein.

As understood by those in the art, controller 104 includes a processor that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for implementing the methods and apparatus described herein.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

It will be appreciated that the above description for clarity has described various embodiments with reference to different functional units and processors. However, it will be apparent that any suitable distribution of functionality between different functional units or processors may be used. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the devices and methods described herein. Rather, the foregoing detailed description will provide those skilled in the art with a convenient road map for implementing exemplary embodiments. It being understood that various changes may be made in the function and arrangement of elements described in an exemplary embodiment without departing from the scope of the invention as set forth in the appended claims.

What is claimed is:

1. A method of alerting a user of scheduled tasks, the method comprising:
    sensing a physiological parameter of the user through a sensing device proximate the user's body;
    detecting the onset of a sleep state of the user;
    gathering, upon detecting the onset of the sleep state of the user, a scheduled task pertaining to the user; and
    alerting the user of the scheduled task prior to the user going to sleep.

2. The method of claim 1, wherein attaching comprises securing said device to the user's wrist using a wrist band.

3. The method of claim 1, wherein detecting comprises monitoring and identifying physiological data associated with a pre-sleep state.

4. The method of claim 3, wherein said physiological data comprises user limb movements.

5. The method of claim 3, wherein said physiological data comprises at least one of: galvanic skin response, pulse oxymetry data, heart rate, and respiration.

6. The method of claim 1, wherein detecting comprises detecting a predetermined time of day.

7. The method of claim 1, wherein detecting comprises detecting a pre-sleep state based on prior user history of pre-sleep onset times.

8. The method of claim 1, wherein detecting comprises pattern recognition associated with the user's eyes.

9. The method of claim 7, wherein detecting comprises detecting the user is executing tasks historically done prior to sleep.

10. The method of claim 8, wherein detecting comprises determining when the user's eyelids are closed.

11. The method of claim 7, wherein detecting comprises detecting nodding of the user's head.

12. The method of claim 3, wherein detecting comprises detecting the user's skin temperature.

13. The method of claim 1, wherein detecting comprises detecting at least one of: ambient light, ambient temperature, background noise, breathing rate, and background motion.

14. The method of claim 1, wherein gathering comprises retrieving task information from an on-board database.

15. The method of claim 1, wherein gathering comprises retrieving task information from a remote database.

16. The method of claim 1, wherein gathering comprises retrieving information from at least one of: a schedule, a calendar, to do list, news brief, traffic alert, email, voice mail, traffic notice, call logs, and text messages.

17. The method of claim 1, wherein said alerting comprises at least one of: audible alarm, vibration, blinking LEDs, text-to-speech, and visual display.

18. A method of reminding the user of a wearable device to attend to scheduled tasks prior to entering a sleep state, the method comprising:
    monitoring at least one of physiological and environmental parameters using at least one sensor associated with said device;
    detecting, using said at least one sensor, the onset of a pre-sleep state of the user;
    retrieving, upon detecting the onset of the pre-sleep state of the user, at least one scheduled task to be attended to by the user before going to sleep;
    reminding the user of said scheduled task; and
    receiving confirmation that the user has attended to said task.

19. A wearable device for alerting a user of scheduled tasks prior to falling asleep, the device comprising:
    a controller;
    a user interface module coupled to said controller, wherein the user interface module facilitates user interaction with said device;
    a sensor coupled to said controller, wherein the sensor detects a pre-sleep state of the user;
    a memory module associated with said device;
    wherein the controller is configured to retrieve a scheduled task, upon detecting the onset of the pre-sleep state of the user, from said memory module and thereafter cause an alert to be provided to the user upon receipt of a signal from said sensor indicative of said pre-sleep state.

20. The device of claim 19, wherein said sensor is configured to monitor a physiological parameter of the user associated with said pre-sleep state.

* * * * *